United States Patent [19]
Kim

[11] Patent Number: 5,805,694
[45] Date of Patent: Sep. 8, 1998

[54] REDIALING METHOD BY EDITING TELEPHONE NUMBER IN TELEPHONE TERMINAL EQUIPMENT

[75] Inventor: Su-Suck Kim, Gumi, Rep. of Korea

[73] Assignee: SamSung Electronics Co., Ltd., Suwon, Rep. of Korea

[21] Appl. No.: 727,155

[22] Filed: Oct. 8, 1996

[30] Foreign Application Priority Data

Oct. 11, 1995 [KR] Rep. of Korea .................. 34858/1995

[51] Int. Cl.⁶ ................................................ H04M 1/272
[52] U.S. Cl. ..................... 379/354; 379/209; 379/355; 379/356; 379/387
[58] Field of Search .................................. 379/350, 352, 379/355, 354, 356, 209, 216, 142, 387, 390

[56] References Cited

U.S. PATENT DOCUMENTS

| | | | |
|---|---|---|---|
| 4,143,243 | 3/1979 | Sutton | 379/69 |
| 4,571,455 | 2/1986 | Labock et al. | 379/40 |
| 4,860,339 | 8/1989 | D'Agosto, III et al. | 379/67 |
| 4,868,858 | 9/1989 | Faith | 379/21 |
| 4,887,294 | 12/1989 | Ruey-Guang | 379/355 |
| 4,930,155 | 5/1990 | Kurokawa | 379/354 |
| 4,933,968 | 6/1990 | Iggulden | 379/216 |
| 5,136,637 | 8/1992 | Rust et al. | 379/356 |
| 5,239,576 | 8/1993 | Yoshida et al. | 379/355 |
| 5,243,646 | 9/1993 | McCarthy | 379/356 |
| 5,268,959 | 12/1993 | Hong | 379/356 |
| 5,394,462 | 2/1995 | Maemura | 379/142 |
| 5,412,713 | 5/1995 | Baals et al. | 379/96 |
| 5,455,858 | 10/1995 | Lin | 379/355 |

*Primary Examiner*—Krista Zele
*Assistant Examiner*—Scott Wolinsky
*Attorney, Agent, or Firm*—Robert E. Bushnell, Esq.

[57] ABSTRACT

A redialing method for telephone terminal equipment includes the steps of: dialing a telephone number in response to user input of numeric keys representative of the telephone number, and storing respective digits of the telephone number; displaying the telephone number in response to user input of a redial key when a line corresponding to the telephone number is busy; creating an edited telephone number by enabling the user to adjust a final digit of the telephone number upwardly or downwardly; and then dialing the edited telephone number in response to user input of the redial key.

14 Claims, 2 Drawing Sheets

REDIALING METHOD BY EDITING TELEPHONE NUMBER IN TELEPHONE TERMINAL EQUIPMENT

CROSS-REFERENCE TO RELATED APPLICATIONS

This application makes reference to, incorporates the same herein, and claims all benefits accruing under 35 U.S.C. §119 arising from an application for Redialing Method By Editing Telephone Number In Telephone Terminal Equipment earlier filed in the Korean Industrial Property Office on 11 Oct. 1995 and there duly assigned Ser. No. 34858/1995.

BACKGROUND OF THE INVENTION

The present invention relates to a redialing method for telephone terminal equipment, and more particularly, to a method for performing a redialing operation after editing the final digit of an originally dialed telephone number.

In a facsimile or telephone system employing a conventional redial function, when a redial key is input after an originally dialed telephone number is stored, the originally dialed telephone number is automatically redialed. This type of conventional redial function is well-known, and is employed in most commercially available telephones.

An improvement to the conventional redial function is disclosed in U.S. Pat. No. 4,930,155 entitled Multiple Redialing System issued to Kurokawa. In Kurokawa '155, each time a recall key is depressed, another telephone number is read out from memory and displayed at a display unit in a predetermined order. Then, when a redial key is depressed while a desired telephone number is displayed at the display unit, a call is automatically placed to a station of that desired telephone number. While this type of conventional art is beneficial in its own right, I believe that another type of redialing method should be contemplated.

In particular, many situations exist where a business, or party being called has two different telephone numbers which are exactly the same, except for the final digit. For example, a given business may utilize the telephone numbers 450-1111 and 450-1112. In these cases, if a user of a telephone system employing a conventional redial function places a call to one of the numbers and receives a busy signal, he or she can either depress the redial key in the hope that the line is now free, or can manually input the other number. While simply depressing the redial key is clearly easier than manually entering the other number, the likelihood of establishing contact is usually maximized by performing the latter. Performing this latter option, however, is inconvenient for the user since it requires several inputs, most of which are identical to the previously input number. To rectify this problem, I believe that the redial function should provide the user with the ability to edit the originally dialed number.

SUMMARY OF THE INVENTION

Therefore, it is an object of the present invention to provide an improved redialing method for telephone terminal equipment.

It is another object to provide a redialing method that enables a user to change the final digit of an originally dialed telephone number prior to performing a redialing operation.

It is still another object to provide a redialing method that reduces the number of key inputs required from a user.

It is yet another object to provide an enhanced redialing feature able to selectively and alternately shift among a plurality of numbers assigned to a subscriber while endeavoring to establish a telephone connection between the person using this enhanced feature and the subscriber.

To achieve these and other objects, the present invention provides a redialing method and telephone terminal equipment accommodating that method. This contemplates dialing a telephone number in response to user input of numeric keys representative of the telephone number, and storing respective digits of the telephone number; displaying the telephone number in response to user input of a redial key when a line corresponding to the telephone number is busy; and creating an edited telephone number by enabling the user to adjust a final digit of the telephone number upwardly or downwardly. The edited telephone number may then be dialed in response to user input of the redial key.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
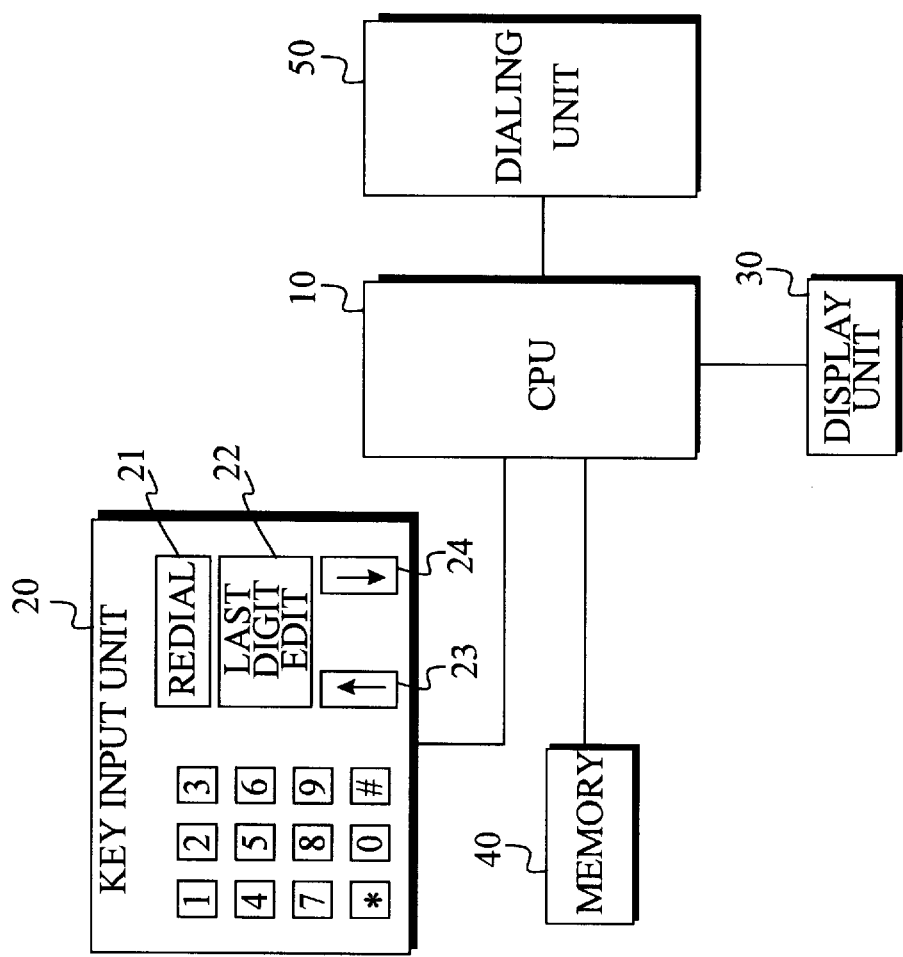
FIG. 1 is a block diagram of a telephone system constructed according to the principles of the present invention.

Turning now to the drawings and referring to FIG. 1, a block diagram of a telephone system constructed according to the principles of the present invention is shown. In FIG. 1, a central processing unit (CPU) 10 controls the overall operation of the telephone system and enables performance of the steps of the present invention. A key input unit 20 includes a plurality of keys, including numeric keys, a redial key 21 and a last digit edit key 22. Depression of these keys generates key data that is input to central processing unit (CPU) 10. A display unit 30 displays alphanumeric characters, and in the practice of the present invention, displays a redialed telephone number under the control of central processing unit (CPU) 10. A memory 40 stores a program for enabling a redialing function and accesses a stored telephone number for redialing under the control of central processing unit (CPU) 10. A dialing unit 50 performs a dialing operation after receiving a telephone number to be dialed from central processing unit (CPU) 10.

Figure 2:
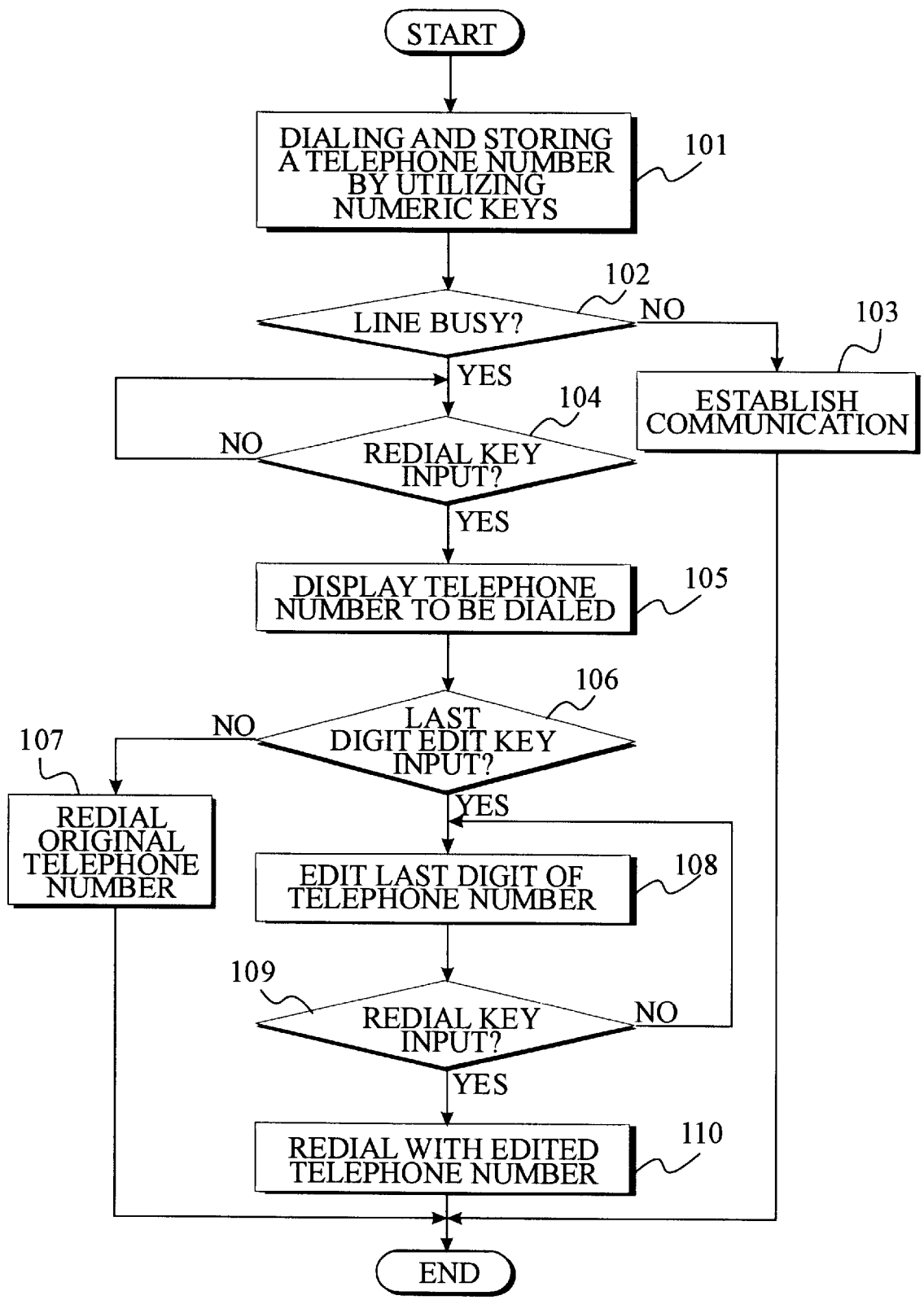
FIG. 2 is a flow chart of a redialing method having an editing function according to the principles of the present invention.

I FIG. 2 is a flow chart of a redialing method having an editing function according to the principles of the present invention. Briefly, the redialing method of FIG. 2 includes the steps of: dialing a telephone number by inputting numeric keys representative of the telephone number and storing the telephone number, inputting a redial key if a line corresponding to the telephone number is busy, displaying the telephone number to be redialed when the redial key is input, detecting whether a last digit edit key is input, redialing the displayed telephone number when the last digit edit key is not input within a given time period, enabling a user to edit the last digit of the displayed telephone number when the last digit edit key is input, and dialing the edited telephone number after editing the last digit of the displayed telephone number.

A preferred embodiment of the present invention will now be described in detail with reference to FIGS. 1 and 2.

In step 101, a user inputs numeric keys representative of a telephone number to be dialed through key input unit 20, Central processing unit (CPU) 10 receives key data generated from the numeric key inputs, controls dialing unit 50 to dial the input telephone number, and stores the input telephone number in a redial buffer of memory 40. In step 102, central processing unit (CPU) 10 determines whether or not the line corresponding to the dialed telephone number is busy. When the line is not busy, central processing unit (CPU) 10 proceeds to step 103 and establishes communication. Alternatively, when the line is busy in step 102, the user can depress redial key 21 on key input unit 20 to redial the telephone number. In step 104, central processing unit (CPU) 10 determines whether or not the redial key 21 is input from key input unit 20. When the redial key is input, central processing unit (CPU) 10 proceeds to step 105. In step 105, central processing unit (CPU) 10 reads the telephone number to be redialed from the redial buffer of memory 40, and enables display of the telephone number on display unit 30. Then, in step 106, central processing unit (CPU) 10 determines whether or not last digit edit key 22 is input from key input unit 20. If last digit edit key 22 is not input within a predetermined time period after the telephone number is displayed, central processing unit (CPU) 10 proceeds to step 107 and controls dialing unit 50 to automatically redial the originally input telephone number that is stored in the redial buffer of memory 40 and displayed on display unit 30. On the other hand, if last digit edit key 22 is input within the predetermined time period in step 106, central processing unit (CPU) 10 proceeds to step 108 and enables the user to edit the last digit of the originally input telephone number using predetermined keys on key input unit 20, such as a volume up (↑) key 23 and a volume down (↓) key 24. In other words, the user can adjust the final digit of the originally input telephone number upwardly or downwardly. After editing the telephone number in step 108, central processing unit (CPU) 10 proceeds to step 109 to determine whether or not redial key 21 is input from key input unit 20. The user is free to edit the last digit of the originally input telephone number in step 108 as many times as desired until redial key 21 is input. Once redial key 21 is input, central processing unit (CPU) 10 proceeds to step 110. In step 110, central processing unit (CPU) 10 controls dialing unit 50 to perform redialing with the edited telephone number.

In the foregoing operation, the user can adjust the final digit of the originally input telephone number upwardly and/or downwardly through several edits until the desired number is obtained. Also, the function of last digit edit key 22 can be incorporated into volume up (↑) key 23 and volume down (↓) key 24. That is, once one of the volume up (↑) key 23 and volume down (↓) key 24 is input, the last digit editing function is automatically activated (i.e., without input of the last digit edit key 22).

As described above, the present invention provides an enhanced redialing method that enables a telephone user to rapidly and conveniently dial a telephone number having a final digit that is different from the final digit of an originally dialed telephone number. This method is particularly useful in situations where a business or party being called has two different telephone numbers that differ only by their final digits. Since the user can edit the originally dialed telephone number before performing a redialing operation, key manipulation is simplified.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiments disclosed as the best mode contemplated for carrying out the present invention, but that the present invention includes all embodiments falling within the scope of the appended claims.

What is claimed is:

1. A redialing method, comprising the steps of:
   dialing a telephone number in response to user input of numeric keys representative of said telephone number, and storing respective digits of said telephone number;
   displaying said telephone number in response to user input of a redial key when a line corresponding to said telephone number is busy;
   editing said telephone number in response to user input of a last digit edit key, said last digit edit key enabling the user to adjust a final digit of said telephone number upwardly or downwardly; and then
   dialing said edited telephone number in response to user input of said redial key.

2. The redialing method as claimed in claim 1, further comprised of the user adjusting said final digit of said telephone number by manually manipulating one or more predetermined keys.

3. The redialing method as claimed in claim 2, wherein said predetermined keys comprise a volume up key and a volume down key.

4. A redialing method, comprising the steps of:
   dialing a telephone number in response to user input of numeric keys representative of said telephone number, and storing respective digits of said telephone number;
   displaying said telephone number in response to user input of a redial key when a line corresponding to said telephone number is busy;
   determining whether user input of a last diet edit key occurs within a predetermined time period after said telephone number is displayed;
   editing said telephone number in response to user input of said last digit edit key, said last digit edit key enabling the user to adjust a final digit of said telephone number upwardly or downwardly when said last digit edit key is input by the user within said predetermined time period after said telephone number is displayed; and then
   dialing said edited telephone number in response to user input of said redial key.

5. The redialing method as claimed in claim 4, further comprised of the user adjusting said final digit of said telephone number by manually manipulating one or more predetermined keys.

6. The redialing method as claimed in claim 5, further comprised of automatically dialing said telephone number being displayed when said last digit edit key is not input by the user within said predetermined time period after said telephone number is displayed.

7. The redialing method as claimed in claim 5, wherein said predetermined keys comprise a volume up key and a volume down key.

8. The redialing method as claimed in claim 4, further comprised of automatically dialing said telephone number being displayed when said last digit edit key is not input by the user within said predetermined time period after said telephone number is displayed.

9. A telephone system, comprising:
- a key input unit having a plurality of keys including numeric keys, a redial key and a last digit edit key for enabling a user to provide key inputs;
- a display unit for providing visual display of alphanumeric data;
- a processing unit for enabling a telephone number to be dialed in response to user input of selected ones of said numeric keys representative of said telephone number, enabling display of said telephone number on said display unit in response to user input of said radial key when a line corresponding To said telephone number is busy, determining whether user input of said last digit edit key occurs within a predetermined time period after said telephone number is displayed on said display unit, generating an edited telephone number by enabling the user to adjust a final digit of said telephone number upwardly or downwardly when said last digit edit key is input by the user within said predetermined time period after said telephone number is displayed on said display unit, and then enabling said edited telephone number to be dialed in response to user input of said redial key.

10. The telephone system as claimed in claim 9, further comprising a dialing unit for dialing said telephone number and said edited telephone number under the control of said processing unit.

11. The telephone system as claimed in claim 10, further comprising a memory for storing respective digits of said telephone number as said telephone number is dialed.

12. The telephone system as claimed in claim 11, further comprised of said processing unit enabling automatic dialing of said telephone number displayed on said display unit when said last digit edit key is not input by the user within said predetermined time period after said telephone number is displayed on said display unit.

13. The telephone system as claimed in claim 9, further comprising a memory for storing respective digits of said telephone number as said telephone number is dialed.

14. The telephone system as claimed in claim 9, further comprised of said processing unit enabling automatic dialing of said telephone number displayed on said display unit when said last digit edit key is not input by the user within said predetermined time period after said telephone number is displayed on said display unit.

* * * * *